UNITED STATES PATENT OFFICE.

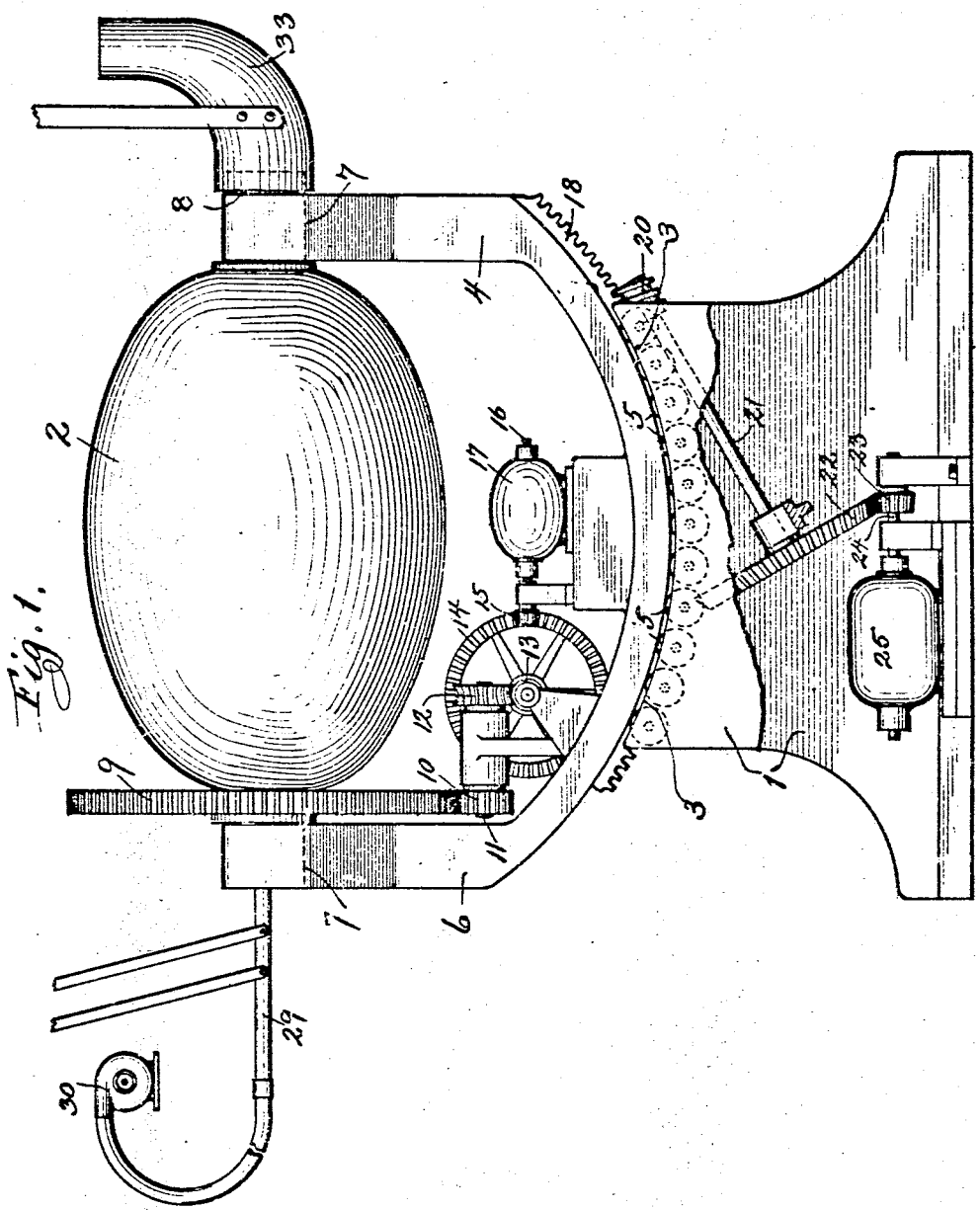

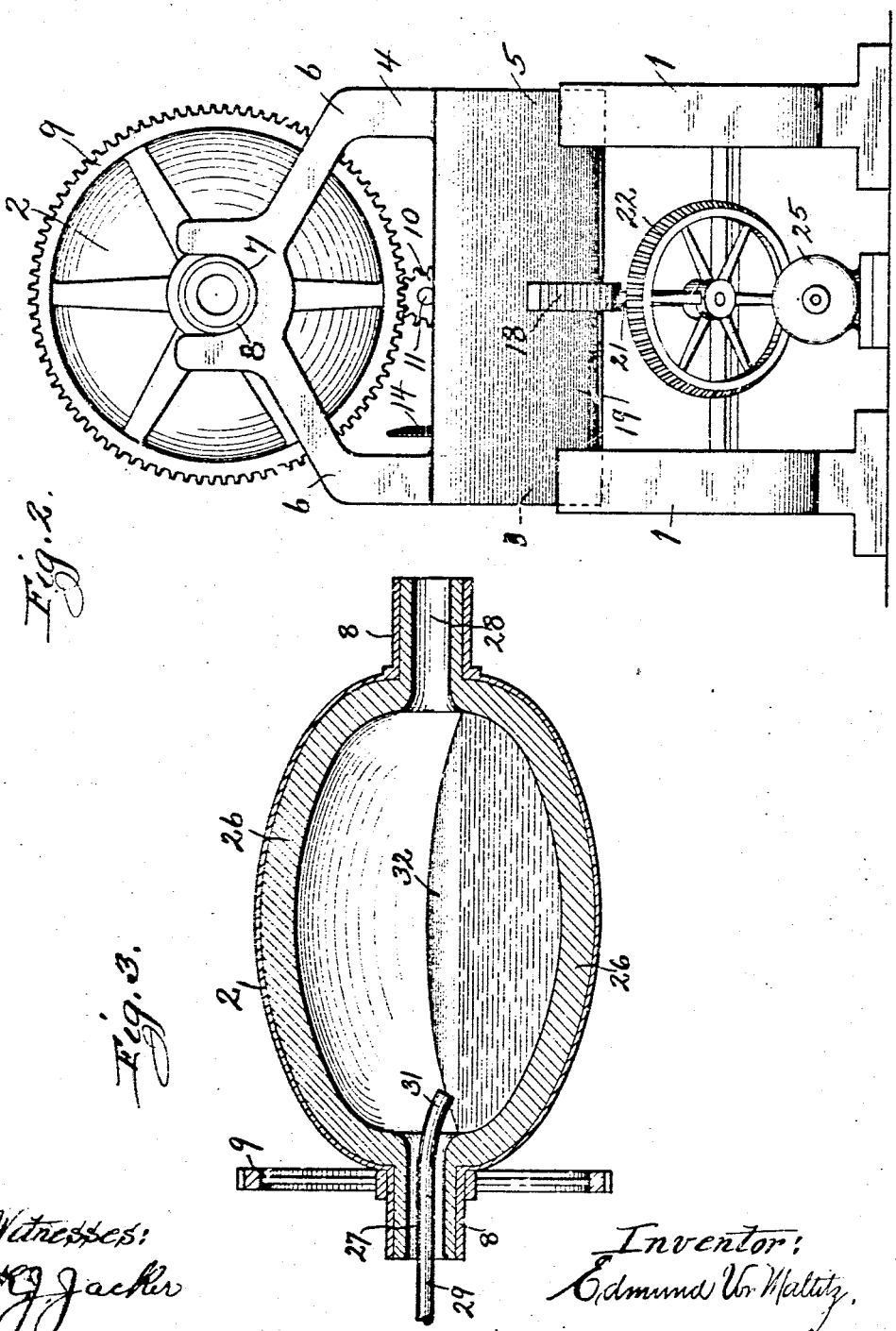

EDMUND VON MALTITZ, OF CHICAGO, ILLINOIS.

PROCESS FOR PURIFYING IRON.

No. 879,480.　　　　Specification of Letters Patent.　　　　Patented Feb. 18, 1908.

Application filed April 30, 1906. Serial No. 314,367.

*To all whom it may concern:*

Be it known that I, EDMUND VON MALTITZ, a citizen of Germany, residing at Chicago, in the county of Cook and State of Illinois, have invented a certain new and useful Process for Purifying Iron, of which the following is a specification.

This invention relates to an improved process for purifying iron preparatory to making steel or for use otherwise where it is desirable to have the metal low in impurities and particularly low in carbon, silicon, phosphorus and sulfur.

As is understood by those skilled in the art in the making of steel in accordance with the Bessemer and analogous processes, melted pig iron is subjected to an oxidizing treatment in a suitable furnace for the purpose of oxidizing and eliminating the impurities contained in the iron until the percentages remaining are below that which is permissible in the steel and until the carbon is either practically all removed ready for re-carburization or eliminated down to that carbon content which the steel is to have.

Numerous processes have been devised for making steel after this general plan, but each more or less limited in its applications. For example, in carrying out the Bessemer process, phosphorus and sulfur cannot be sufficiently eliminated and it is therefore necessary to use a particular kind of iron derived from a high grade ore which is low in phosphorus, and because of its limited quantity, comparatively expensive.

The basic Bessemer or Thomas process depends to a large extent upon the heat evolved by the oxidation of phosphorus. It has therefore been found necessary to use pig iron with not less than one per cent. phosphorus in carrying out this process. Between the grades of iron suitable for use with the Bessemer process and those suitable for use with the Thomas process, there is a wide range of irons too low in phosphorus for the one process and too high for the other, and therefore unusable for either. As a matter of fact the chief bulk of the iron ores derived from the Lake Superior districts, which constitute the chief source of supply for the iron industries of the country today, are of those grades medium in phosphorus and unsuitable for the Bessemer or Thomas processes, while the low phosphorus (so called "Bessemer ores") are rapidly becoming exhausted. The iron from these medium grade ores has heretofore been convertible into steel only by the open hearth process. The open hearth processes are, however, comparatively slow and much more expensive.

It is the object of the present invention to provide a process which is effective in eliminating the impurities usually contained in iron; which is not limited in its application to certain kinds of iron only but is suitable for use in purifying iron derived from a wide range of ores; to provide a process which minimizes the defects likely to be found in steel, such as are due to occluded gases, or to the presence of an excess of phosphorus; to provide a process which is simple, rapid and inexpensive, and does not entail the use of special "doctoring" of the metal; to provide a process which may be carried out by the use of simple and thoroughly practical apparatus; and in general to provide an improved process of the character referred to.

The invention will be most readily understood by a description of the method, as performed with the aid of a vessel and suitable associated apparatus particularly designed for carrying out this method, but it is to be understood that the method is in no sense limited to the specific apparatus shown and described.

In the drawings—Figure 1 is a general view showing in side elevation an apparatus adapted for carrying out my process, one of the base supports being broken away to disclose the driving mechanism. Fig. 2 is an end elevation of the same; Fig. 3 is a vertical axial sectional view of the vessel only.

Referring to the drawings, 1, 1, designate a pair of base standards suitably spaced apart and at their upper ends suitably shaped to form concave parti-circular tracks 3, upon which is mounted a cradle frame 4. Anti-friction rolls 5 are journaled in the standards 1, the peripheries of which support the track surfaces of the cradle 4. The two side members 6 of the cradle are at each end brought together at the top to form trunnion bearings 7, within which are journaled the trunnions 8 of an oval vessel 2. Upon one end of the vessel, adjacent to its trunnion and concentrically with the axis of the latter, is mounted a large gear 9 which meshes with a spur-gear 10 carried by a shaft 11 and having at its opposite end a worm-gear 12. The worm-gear is in turn engaged by a worm-shaft 13 carrying a bevel-gear 14 and actuated by a bevel-pinion 15 mounted upon the shaft 16 of an electric motor 17. The entire train of gear mechanism is mounted on the cradle frame so as to move bodily with the latter.

In order to impart a tilting or oscillatory movement to the cradle and the vessel supported therein, a parti-circular rack 18 is provided rigidly united with the two side members of the cradle frame by means of cross bars 19 and arranged parallel or concentric with the track surfaces of the cradle; this rack being provided with teeth adapted to a worm-gear 20 mounted upon a shaft 21 journaled in suitable bearings upon the standard frame 1. The shaft 21 extends obliquely downward and carries at its lower end a bevel-gear 22 which meshes with a bevel-pinion 23 upon the shaft 24 of a second electric motor 25. The motor 25 is mounted on the base of the main frame 1 and is of a type which is capable of being reversed and running in either direction.

The interior of the vessel 2 is provided with a refractory lining of basic or neutral material 26, and the trunnions of the vessel are hollow to provide inlet and outlet passages 27 and 28, respectively, communicating with the interior of the vessel. A blast pipe 29, communicating with a suitable source of pressure, as for example a blower 30, is arranged to extend into the inlet trunnion of the vessel and terminates in a nozzle 31 which is desirably directed so as to cause the blast to switch horizontally through the vessel across the surface of the batch of material therein, and impinging against that wall of the vessel which is rotating upwardly and where the metal is exposed from beneath the slag, as indicated in dotted lines at 32, Fig. 3, and as will hereinafter more fully appear. A suitable funnel or discharge pipe 33 is detachably connected with the opposite end of the vessel, whereby the outflow blast is deflected and directed upwardly. It is to be understood also that the blast pipe 29 will be either detachably or flexibly connected with the vessel so as to not interfere with the oscillatory movements of the latter.

In operation the vessel 2 will be rotated upon its longitudinal axis while maintained in substantially horizontal position during the principal part of the time in carrying out the treatment of the metal, and will be tilted when it is desired to discharge the batch after treatment. The vessel may also be oscillated or tilted so as to alternately raise one end and then the other during the carrying out of the process, if it be so desired.

In carrying out the process in conjunction with the apparatus described, after the vessel has been thoroughly heated, a suitable charge of melted iron is charged into the same, together with enough burnt lime to insure the presence for reaction purposes of a strongly basic slag. The charge of iron may be varied at will, so long as it does not overflow from the vessel. The apparatus is now set in motion to revolve the vessel; for a vessel large enough to treat fifteen tons of metal in a batch at say from ten to forty revolutions per minute. As soon as the vessel begins to revolve, a blast of air is turned on of low pressure, through the twyer, which blast is preferably though not necessarily so directed as to impinge against the surface of the metal along that wall of the vessel which is rotating upwardly, or, in other words, where the rotary movement of the vessel exposes the surface of the metal proper from beneath the slag. The blast traverses the length of the vessel and passes out through the discharge funnel. The element most promptly attacked by the oxygen of the blown in air is the silicon, which oxidizes to silica and generates considerable heat. The carbon of the iron will be oxidized to carbonic oxid, under the action of heat, and the carbonic oxid will in turn be burned into carbonic dioxid inside of the vessel. This combustion thus taking place in the vessel, on account of its enormous heat evolving capacity, will raise the temperature of the metal rapidly to a point where general oxidation of all of the oxidizable elements is promoted and ensues. This high temperature will, of course, result in forming a liberal quantity of slag at an early stage of the process, which slag will in turn become at once active in eliminating the phosphorus which combines with the basic slag. In other words, practically the entire heat-evolving capacity of the silicon, carbon, manganese and phosphorus is utilized for raising the temperature of the metal and forming slag as rapidly as possible, with correspondingly rapid chemical reactions.

The air, it will be noted, is not passed through the metal, as in the Bessemer process, thus avoiding to the greatest extent the charging of the metal with nitrogen and hydrogen, due to decomposition of moisture in the air, (objectionable because tending to increase the occluded gases in the metal) but nevertheless all parts of the metal are soon subjected to the oxidizing effect of the air because the rotation of the vessel continually exposes fresh surfaces of the metal from beneath the slag. The present process, therefore, is comparatively rapid, and thus avoids the comparatively great length of time required to treat in accordance with those methods, where the oxidation is effected while the metal is comparatively quiescent in the vessel, (the Robert and Tropenas processes are examples) and it also avoids the objectionable features of the Bessemer process, or Bessemer-Thomas process, noted.

The process having been inaugurated, as described, the mechanical rotation and blast may be continued until the impurities are eliminated to the desired extent. Or, without interrupting the rotation, the blast may be either restricted or entirely interrupted at a stage when the slag contains enough iron oxids to act as a purifying agent which will supply the necessary oxygen to continue the elimination of the impurities by oxidation. By so doing I recover to a greater or less extent the iron in the slag, which would otherwise be lost. Furthermore the metal containing oxygen in the form of ferrous oxid will also thus be deprived of this objectionable compound, which is prone to cause blow-holes in the solidifying steel. I may now either first draw off the slag and then proceed to recarburize and convert the batch into steel in the usual manner while still contained in the vessel. By so doing I am able to utilize the agitating movement of the vessel to insure perfect mixing of the metal with the recarburizing and deoxidizing ingredients. Or I may tap off the charge of metal before removing the slag and before recarburizing, or I may first draw off the slag and then the metal. Either of these ways of handling the metal after it has been purified is permissible.

It is to be noted that in carrying out my process not only does the oxidation take place chiefly at the surface of the metal, but the revolving movement of the vessel will obviously, under the centrifugal action of the metal, tend to force the impurities, all specifically lighter than pure iron, toward the axis of rotation of the vessel, viz: to the surface of the batch. The major quantities of the impurities being thus forced toward the surface, the oxidation and elimination of the same will be correspondingly rapid and the length of treatment correspondingly shortened. The constant and thorough agitation to which the metal is subjected during the whole process will facilitate the elimination of occluded gases, just as the stirring of a batch of metal after it has been poured into the ladle does.

As hereinbefore intimated, there are a number of factors which contribute in the production of an extremely high temperature in the combustion space within the vessel and above the batch of metal, which temperature, in conjunction with other factors, effects the speedy consummation of the treatment. The temperature produced is so high that except for the fact that the position of the vessel is constantly changed it would result in very rapidly destroying the lining and breaking down the vessel. In carrying out the process in a preferred manner, in which the vessel is so manipulated as to constantly turn up fresh surfaces of metal, and at the same time to constantly subject different parts of the wall of the vessel to the greatest heat, two distinct and important results follow. Those portions of the vessel which for the time being are above the metal, and constitute the roof of the combustion chamber, are gradually raised in temperature, but at the same time these highly heated portions are constantly carried downward beneath the melted batch which is inevitably of somewhat lower temperature, with the result that the walls of the vessel are maintained sufficiently below the temperature obtaining in the combustion chamber to preserve them, or at least very greatly prolong the life of the lining. At the same time the excess of heat imparted to that portion of the vessel forming the roof of the combustion chamber is in turn imparted to the molten mass as it descends beneath the same, thus contributing to the temperature of the latter and hastening the process. Another important result of the rotary movement of the vessel is that it imparts a distinct circulation to the slag supernatant upon the metal, as well as the circulatory movement to the metal itself. That is to say, the surface friction and molecular adhesion between the wall of the vessel and the metal constantly turns up that side of the metal lying against the uprising side of the vessel, and the continual back-flow of this uplifted metal at the surface carries with it the under surface portions of the supernatant slag, so that there is a constant circulatory movement of the slag, the top layers of which flow toward the rising side of the vessel and the lower layers of which are carried away by the molecular friction and current effect of the metal. This continual circulation of the slag, and continual bringing of fresh surfaces of slag and metal together, obviously contributes greatly to the desired chemical reactions and insures that all portions of the metal will, in a comparatively short time, be brought into intimate relation with the slag, and this at a time immediately following the oxidizing exposure to the air, at which time, the impurities are brought into a condition in readiness to combine chemically with the basic slag. It is to be particularly noted that the handling of the metal is such that the mass is at no time broken up, churned or disturbed to such extent as to facilitate the absorption or occlusion of gases.

While it will be obvious from the foregoing that the imparting of movement to the batch by means of a rotary vessel is most effective, yet a different movement might be imparted thereto which would to a considerable extent secure the same results without breaking up or destroying the solidarity of the mass. Accordingly I have herein claimed the invention broadly, i. e. as not limited to a manipulation in which a continuous onflow in a given direction is imparted to the material, and have also claimed the invention more narrowly and as limited in this manner.

While I deem it important to so manipulate the metal that its mass shall remain substantially unbroken during the treatment, yet it will be obvious that several distinct advantages incident to the process may still be secured when it is so modified as to turn up or otherwise agitate the surface portions of the batch to an extent or degree which more or less interrupts the continuity of the mass. For example, the vessel of the apparatus described herein might be rotated at such a speed as to produce this effect. Nevertheless the purifying treatment would be carried out, the maintaining of the walls of the vessel in the relatively cool condition described would be effected and the rapid exposure of all parts of the metal to the purifying action of the oxidizing blast and action of the slag would be effected, but owing to the over-exposure of the metal to the oxidizing blast in the presence of the incident heat obtaining in the combustion chamber, there would be an unnecessary oxidation and loss of metal.

I claim as my invention:

1. An improvement in the art of purifying metal which consists in confining a mass of fully fluid metal and a supernatant quantity of slag formed of added basic material in a substantially unbroken body, imparting to the metal a movement which constantly exposes in limited quantities fresh portions thereof at the surface from beneath the slag and without destroying the solidarity of the mass, subjecting such exposed surfaces to the action of an oxidizing gas and effecting the refinement of the batch by that heat due alone to the oxidizing reactions of the self-contained contents of the batch.

2. An improvement in the art of purifying iron which consists in confining a mass of fully fluid metal and a supernatant quantity of slag formed by the addition of basic material in a substantially unbroken body, imparting to the metal a movement which constantly exposes fresh portions thereof at the surface from beneath the slag and without destroying the solidarity of the mass, and subjecting such exposed surfaces to the action of an oxidizing gas in a confined combustion space and effecting the refinement of the batch by that heat due alone to the oxidizing reactions of the self-contained contents of the batch.

3. An improved process of purifying iron which consists in confining a mass of fluid metal and a supernatant quantity of basic slag in a body of substantially unbroken solidarity, said slag being formed by the addition of basic material of sufficient quantity to substantially cover and protect against oxidation the surface of the metal, imparting to one or more of the uprising sides of said mass an upwardly flowing movement which exposes fresh portions of the metal at the top surface thereof from beneath the slag without substantially disturbing the solidarity of the mass and concurrently subjecting such exposed metal to the action of an oxidizing blast in a substantially closed combustion space and effecting the refinement of the batch by that heat due alone to the oxidizing reactions of the self-contained contents of the batch.

4. An improved process of purifying iron which consists in confining in a substantially closed space a substantially unbroken mass thereof in fluid state together with a supernatant quantity of basic slag, imparting to the batch a bodily rotary circulatory movement which continually brings to the surface and exposes from beneath the slag fresh portions of the metal and continuously imparts a different circulatory movement to the slag, and subjecting such exposed surfaces concurrently to the action of an oxidizing gas and effecting the refinement of the batch by that heat due alone to the oxidizing reactions of the self-contained contents of the batch.

5. An improved process of purifying metal which consists in concurrently subjecting the molten metal in a substantially closed vessel to mechanical agitation, to surface oxidation in the presence of an oxidizing gas and suitable slag, and to the heat of combustion thereby generated, continuing this treatment until the slag contains substantial quantities of iron oxids, then checking the oxidation due to the oxidizing gas by restricting or arresting the supply of such gas and continuing the mechanical agitation of the mass, thereby reducing the iron oxid of the slag and deoxidizing the batch.

EDMUND VON MALTITZ.

Witnesses:
ALBERT H. GRAVES,
EMILIE ROSE.